(12) United States Patent
Côté et al.

(10) Patent No.: US 11,330,296 B2
(45) Date of Patent: May 10, 2022

(54) SYSTEMS AND METHODS FOR ENCODING IMAGE DATA

(71) Applicant: Apple Inc., Cupertino, CA (US)

(72) Inventors: Guy Côté, Aptos, CA (US); Athanasios Leontaris, Cupertino, CA (US); Muge Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,750

(22) Filed: Sep. 14, 2020

(65) Prior Publication Data

US 2022/0086485 A1 Mar. 17, 2022

(51) Int. Cl.
| | |
|---|---|
| *H04N 19/30* | (2014.01) |
| *H04N 19/61* | (2014.01) |
| *H04N 19/187* | (2014.01) |
| *H04N 19/50* | (2014.01) |
| *H04N 19/59* | (2014.01) |
| *H04N 19/103* | (2014.01) |
| *H04N 19/182* | (2014.01) |
| *H04N 19/517* | (2014.01) |
| *H04N 19/136* | (2014.01) |

(52) U.S. Cl.
CPC .......... *H04N 19/59* (2014.11); *H04N 19/103* (2014.11); *H04N 19/136* (2014.11); *H04N 19/182* (2014.11); *H04N 19/517* (2014.11)

(58) Field of Classification Search
CPC .... H04N 19/59; H04N 19/103; H04N 19/136; H04N 19/182; H04N 19/517
See application file for complete search history.

(56) References Cited

U.S. PATENT DOCUMENTS

| | | |
|---|---|---|
| 9,106,888 B2 | 8/2015 | Chou |
| 9,215,472 B2 | 12/2015 | Orr et al. |
| 9,218,639 B2 | 12/2015 | Cote et al. |
| 9,224,186 B2 | 12/2015 | Rygh et al. |
| 9,224,187 B2 | 12/2015 | Cote et al. |
| 9,270,999 B2 | 2/2016 | Cote et al. |
| 9,292,899 B2 | 3/2016 | Schaub et al. |
| 9,299,122 B2 | 3/2016 | Okruhlica et al. |
| 9,305,325 B2 | 4/2016 | Cheng et al. |
| 9,336,558 B2 | 5/2016 | Cote et al. |
| 9,351,003 B2 | 5/2016 | Cote et al. |
| 9,380,312 B2 | 6/2016 | Cote et al. |
| 9,621,917 B2 | 4/2017 | Kottke et al. |
| 10,187,655 B2 | 1/2019 | Chou et al. |
| 2005/0232499 A1 | 10/2005 | Ha et al. |
| 2005/0276328 A1 | 12/2005 | Sakamoto |

(Continued)

*Primary Examiner* — Zaihan Jiang
(74) *Attorney, Agent, or Firm* — Fletcher Yoder, P.C.

(57) ABSTRACT

Systems and methods for improving operational efficiency of a video encoding system used to encode image data are provided. In embodiments, a video encoding system includes image processing circuitry configured to receive source image data and derive full-resolution image data and low-resolution image data from the source image data. The video encoding system also includes a low resolution pipeline configured to receive the low-resolution image data and determine one or more low resolution inter prediction modes based on the low-resolution image data. Furthermore, the video encoding system includes a main pipeline configured to encode the full-resolution image data based on the one or more low resolution inter prediction modes.

20 Claims, 6 Drawing Sheets

(56) References Cited

U.S. PATENT DOCUMENTS

| | | |
|---|---|---|
| 2007/0071104 A1 | 3/2007 | Kondo |
| 2007/0171981 A1 | 7/2007 | Qi |
| 2007/0237232 A1 | 10/2007 | Chang et al. |
| 2008/0107307 A1 | 5/2008 | Altherr |
| 2011/0194608 A1 | 8/2011 | Rusert et al. |
| 2013/0188704 A1* | 7/2013 | Zhou .................... H04N 19/176 375/240.12 |
| 2013/0188737 A1* | 7/2013 | Maani ................. H04N 19/176 375/240.25 |
| 2013/0301727 A1 | 11/2013 | Huang et al. |
| 2014/0010294 A1* | 1/2014 | Ye ....................... H04N 19/157 375/240.12 |
| 2014/0037011 A1* | 2/2014 | Lim ..................... H04N 19/513 375/240.16 |
| 2014/0126638 A1 | 5/2014 | Sievers |
| 2015/0016531 A1* | 1/2015 | Hannuksela ........... H04N 19/46 375/240.16 |
| 2015/0092833 A1 | 4/2015 | Ku et al. |
| 2015/0092843 A1 | 4/2015 | Millet et al. |
| 2015/0092855 A1 | 4/2015 | Chou et al. |
| 2015/0163505 A1* | 6/2015 | Sato ..................... H04N 19/503 375/240.12 |
| 2015/0195566 A1* | 7/2015 | Hinz .................... H04N 19/865 375/240.13 |
| 2015/0296211 A1* | 10/2015 | Chuang ................. H04N 19/30 375/240.12 |
| 2016/0007038 A1 | 1/2016 | Chou et al. |
| 2016/0021385 A1 | 1/2016 | Chou et al. |
| 2017/0094311 A1 | 3/2017 | Chou et al. |
| 2017/0155906 A1* | 6/2017 | Puri .................... H04N 19/1883 |
| 2017/0155924 A1* | 6/2017 | Gokhale ............ H04N 19/1883 |
| 2017/0332099 A1 | 11/2017 | Lee et al. |
| 2019/0026857 A1 | 1/2019 | Brasnett et al. |
| 2019/0215518 A1 | 7/2019 | Alagappan et al. |
| 2019/0268565 A1* | 8/2019 | Tsukagoshi ............ H04N 7/015 |
| 2020/0021841 A1* | 1/2020 | Leontaris ............. H04N 19/176 |
| 2020/0228836 A1* | 7/2020 | Schwarz ................ G06T 15/04 |
| 2020/0302658 A1* | 9/2020 | Simon ................... H04N 19/88 |

\* cited by examiner

SYSTEMS AND METHODS FOR ENCODING IMAGE DATA

BACKGROUND

The present disclosure generally relates to image processing, and, more particularly, to video encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information, for example, as text, still images, and/or video based on corresponding image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of its display pixels based on the decoded image data.

To facilitate encoding, prediction techniques may be used to indicate the image data by referencing other image data. For example, since successively displayed images (e.g., image frames) may be generally similar, inter (e.g., inter-frame) prediction techniques may be used to indicate image data (e.g., a prediction unit) corresponding with a first image frame by referencing image data (e.g., a reference sample) corresponding with a second image frame, which may be displayed before or after the first image frame. To facilitate identifying the reference sample, a motion vector may indicate position of a reference sample in the second image frame relative to position of a prediction unit in the first image frame. In other words, instead of directly compressing the image data, the image data may be encoded based at least in part on a motion vector used to indicate desired value of the image data.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded. However, for certain types of image data, such as image data associated with relatively higher resolution images, determining encoding parameters to utilize to encode image data may be computationally complex, for example, due to the amount of image data being analyzed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to processing techniques that may be utilized when performing image processing. For example, the techniques described herein may be utilized as part of a process for encoding source image data. In particular, the techniques described herein relate to scaling source image data prior to performing encoding operations such as determining encoding parameters. For instance, full-resolution image data and low-resolution image data may be derived from source image data. The full-resolution image data may be encoded based on encoding parameters that can be determined based on the low-resolution image data and the full-resolution image data. By utilizing scaled image data, memory bandwidth may be reduced. Additionally, as discussed below, portions of a video encoding system may utilize the low-resolution image data to perform low-resolution motion estimation techniques without downscaling image data (e.g., full-resolution image data). Accordingly, the techniques described herein may enable video encoding systems to encode image data more efficiently.

A video encoding system may determine encoding parameters and implement the encoding parameters to encode the full-resolution image data that is generated from source image data. In some embodiments, the full-resolution image data may be encoded using prediction techniques (e.g., inter prediction techniques) by referencing other image data. For example, inter prediction techniques may facilitate encoding the full-resolution image data by referencing image data used to display other image frames.

The video encoding system may determine a reference sample in a second (e.g., reference) image frame for full-resolution image data corresponding with a first image frame using an inter prediction mode. The inter prediction mode may include a motion vector that indicates position (e.g., spatial position) of the reference sample in the second image frame relative to position of the source image data in the first image frame. Additionally, the inter prediction mode may include a reference index that indicates display order (e.g., temporal position) of the second image frame relative to the first image frame.

A motion estimation (ME) block in the video encoding system may determine one or more candidate inter prediction modes. The motion estimation block may perform a motion estimation search to determine reference samples that are similar to the full-resolution image data. Once a reference sample is determined, the motion estimation block may determine a motion vector and reference index to indicate location (e.g., spatial position and temporal position) of the reference sample relative to the full-resolution image data. Generally, performing motion estimation searches may be computationally complex and, thus, time-consuming. However, a duration provided for the motion estimation block to perform its search may be limited, particularly to enable real-time or near real-time transmission or display as refresh rate and/or resolution increases.

Accordingly, the present disclosure provides techniques to improve operational efficiency of the video encoding system. In some embodiments, operational efficiency may be improved by including a low resolution pipeline in parallel with a main encoding pipeline, which determines encoding parameters used to encode the full-resolution image data. Additionally, in some embodiments, the low resolution pipeline and the main encoding pipeline may both be provided access via direct memory access (DMA) to the full-resolution image data and low-resolution image data (derived from the source image data and) stored in memory.

Thus, in such embodiments, the low resolution pipeline and the main encoding pipeline may operate using relatively independent operational timing, which may enable the low resolution pipeline to operate one or more image frames ahead of the main encoding pipeline. In this manner, the low resolution pipeline may determine information ahead of time for use in the main encoding pipeline. By running the low resolution pipeline at least one image frame ahead of the main encoding pipeline, information (e.g., statistics and/or low resolution inter prediction modes) determined by the low resolution pipeline may be used by the main encoding pipeline, for example, to determine motion-weight (e.g., lambda) tuning information used in rate-distortion calculations, frame-rate conversion, image stabilization, and/or the like.

For example, the low resolution pipeline may include a low resolution motion estimation (LRME) block that processes the low-resolution image data to determine low resolution inter prediction modes. The low resolution motion estimation block may perform a motion estimation search on the low-resolution image data, which may be derived from full-resolution samples of image data used as references in the motion estimation search, to determine a downscaled reference sample that is similar to the downscaled source image data. To indicate location of the downscaled reference sample, the low resolution motion estimation block may determine a low resolution inter prediction mode, which includes a motion vector and a reference index.

Since downscaled image data (the low-resolution image data) should be similar to the full-resolution image data, low resolution inter prediction modes may provide an indication where reference samples in full resolution are expected to be located. Accordingly, the motion estimation block in the main encoding pipeline may be initialized with the low resolution inter prediction modes as candidates. In this manner, the low resolution motion estimation block may facilitate reducing amount of image data searched by the motion estimation block and, thus, improving operational efficiency of the video encoding system. To improve processing efficiency, the low resolution motion estimation block may prune the low resolution inter prediction modes before they are evaluated as candidate inter prediction modes by the main encoding pipeline, for example, to consolidate similar low resolution inter prediction modes and, thus, to enable the number of candidate inter prediction modes evaluated by the main encoding pipeline to be reduced.

Additionally, when the low resolution motion estimation block is operating one or more image frame ahead of the main encoding pipeline, the low resolution motion estimation block may determine statistics based at least in part on luma of the source image data. In some embodiments, the statistics may be indicative of global motion across multiple image frames and, thus, used for image stabilization. For example, the low resolution motion estimation block may determine a histogram statistic used to determine a best motion vector and, thus, a global motion vector determined based at least in part on the best motion vector. Based on the global motion statistics, the motion estimation block, which may be implemented in the main encoding pipeline, may determine a global motion vector indicative of motion across multiple image frames. Additionally, based on the global motion vector, the motion estimation block may adjust the candidate inter prediction modes considered, for example, by adjusting (e.g., offsetting) their motion vectors based at least in part on the global motion vector. Furthermore a search area in image data may be adjusted based on the global motion vector.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An electronic device may facilitate visually presenting information by instructing an electronic display to display one or more images (e.g., image frames) based on corresponding image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

A video encoding system may determine encoding parameters and implement the encoding parameters to encode source image data. To facilitate encoding, source image data for an image may be divided into one or more coding units. As used herein, a "coding unit" is intended to describe a sample of source image data (e.g., pixel image data) corresponding to a group of display pixels, which is encoded using the same prediction technique. However, it should be noted that "coding unit" may also refer to a sample of image data that is generated from source image data. For instance, as described herein, source image data may be scaled to generate different sets of image data (e.g., scaled image data). The sets of scaled image data, as discussed below, may include full-resolution image data and low-resolution image data. In such a case, a "coding unit" may be a sample of the full-resolution image data generated from source image data.

Accordingly, the video encoding system may determine a prediction technique (e.g., intra prediction technique or inter prediction technique) to be implemented to predict a coding unit, for example, as one or more prediction samples. Prediction techniques may facilitate encoding by enabling the source image data to be indicated via reference to other image data. For example, since an image frame may change gradually, the video encoding system may utilize intra prediction techniques to produce a prediction sample based on image data used to display the same image. Additionally, since successively displayed images may change gradually, the video encoding system may utilize inter prediction techniques to produce a prediction sample based on image data used to display other images.

Although conceptually similar, each prediction technique may include one or more prediction modes that utilize different encoding schemes. In other words, implementing different prediction modes may result in different prediction samples. For example, utilizing a first intra prediction mode (e.g., vertical prediction mode), the video encoding system may produce a prediction sample with each column set equal to image data for a pixel directly above the column. On the other hand, utilizing a second intra prediction mode (e.g., DC prediction mode), the video encoding system may produce a prediction sample set equal to an average of adjacent pixel image data. Additionally, utilizing a first inter prediction mode (e.g., first reference index and first motion vector), the video encoding system may produce a prediction sample based on a reference sample at a first position within a first image frame. Utilizing a second inter prediction mode (e.g., second reference index and second motion vector), however, the video encoding system may produce a prediction sample based on a reference sample at a second position within a second image frame.

Although using the same prediction technique, a coding unit may be predicted using one or more different prediction modes. As using herein, a "prediction unit" is intended to describe a sample within a coding unit that utilizes the same prediction mode. In some embodiments, a coding unit may include a single prediction unit. In other embodiments, the coding unit may be divided into multiple prediction units, which each uses a different prediction mode.

Accordingly, the video encoding system may evaluate candidate prediction modes (e.g., candidate inter prediction modes, candidate intra prediction modes, and/or a skip mode) to determine what prediction mode to use for each prediction unit in a coding unit. To facilitate, a motion estimation (ME) block in the video encoding system may determine one or more candidate inter prediction modes. In some embodiments, an inter prediction mode may include a reference index (e.g., temporal position), which indicates in which image a reference sample is located, and a motion vector (e.g., spatial position), which indicates the position of the reference sample relative to a prediction unit.

To determine a candidate inter prediction mode, the motion estimation block may search image data (e.g., reconstructed samples) used to display other image frames for reference samples that are similar to a prediction unit. Once a reference sample is determined, the motion estimation block may determine a motion vector and reference index to indicate location of the reference sample.

Generally, the quality of the match between prediction unit and reference sample may be dependent on search area (e.g., amount of image data). For example, increasing search area may improve likelihood of finding a closer match with the prediction unit. However, increasing search area may also increase computation complexity as well as increase memory bandwidth utilized to perform searches, which may cause increases in searching duration. In some embodiments, duration provided for the motion estimation block to perform its search may be limited, for example, to enable real-time or near real-time transmission and/or display.

Accordingly, as will be described in more detail below, the present disclosure provides techniques to improve operational efficiency of a video encoding system, for example, by enabling search area and/or candidate prediction modes evaluated by a main encoding pipeline to be adaptively (e.g., dynamically) adjusted based at least in part on processing performed by a low resolution pipeline. In some embodiments, operational efficiency may be improved by including a low resolution pipeline in parallel with the main encoding pipeline. Additionally, in some embodiments, the low resolution pipeline and the main encoding pipeline may both be provided access via direct memory access (DMA) to source image data stored in memory.

Thus, the low resolution pipeline and the main encoding pipeline may operate using relatively independent operational timing. In fact, the low resolution pipeline may operate one or more image frames ahead of the main encoding pipeline. In this manner, the low resolution pipeline may process image data ahead of time to determine information (e.g., low resolution inter prediction modes, luma histogram statistics, and/or sum of absolute difference statistics) to be used in the main encoding pipeline.

To facilitate determining the relevant information, the low resolution pipeline may include a low resolution motion estimation (LRME) block. In some embodiments, the low resolution motion estimation block may downscale source image data (e.g., a coding unit). For example, a low resolution motion estimation block may downscale a 32×32 coding unit to one-sixteenth resolution to generate an 8×8 downscaled coding unit. As also discussed herein, the low resolution motion estimation block may receive (e.g., via DMA access) scaled image data (e.g., downscaled image data) that is generated from source image data by other circuitry (e.g., image pre-processing circuitry) and stored in memory. In some cases, the resolution of the scaled image data may correspond to one-sixteenth of a resolution of other image data generated from source image data. For example, as discussed below, the image pre-processing circuitry may generate full-resolution image data and low-resolution image data from source image data. The low-resolution image data may have a resolution that is one-sixteenth of a resolution of the full-resolution image data. Accordingly, the low resolution motion estimation block may generate a downscaled coding unit without downscaling source image data. Rather, the low resolution motion estimation block may generate the downscaled coding unit using low-resolution image data generated by image pre-processing circuitry (e.g., by utilizing a portion of the downscaled source image data). By doing so, more resources (e.g., processing resources) of the low resolution motion estimation block may be utilized to perform motion estimation techniques. Furthermore, by generating full-resolution image data and low-resolution image data from source image data prior to performing motion estimation techniques and reading the low resolution image data (e.g., instead of the full-resolution image data) when performing low-resolution motion estimation techniques, the amount of memory bandwidth utilized to read image data may be reduced.

The low resolution motion estimation block may then search previously downscaled source image data to find (e.g., identify) a downscaled reference sample that is similar to a downscaled prediction unit within the downscaled coding unit. To indicate location of the downscaled reference sample, the low resolution motion estimation block may determine a low resolution inter prediction mode, which includes a motion vector and a reference index. More specifically, the motion vector may indicate spatial position of a reference sample in full resolution corresponding with the downscaled reference sample relative to a prediction unit in full resolution corresponding with the downscaled prediction unit. Additionally, the reference index may indicate display order (e.g., temporal position) of a reference image frame corresponding with the downscaled reference sample relative to an image frame corresponding with the downscaled prediction unit.

The low resolution motion estimation block may then enable the low resolution inter prediction mode to be accessed and used by the main encoding pipeline. In some embodiments, the low resolution motion estimation block may store the low resolution inter prediction mode in memory using direct memory access and the main encoding pipeline may retrieve the low resolution inter prediction mode using direct memory access. Additionally, the low resolution motion estimation block may store the downscaled source image data in memory for use in subsequent low resolution motion estimation searches.

In some embodiments, the motion estimation block in the main encoding pipeline may retrieve candidate inter prediction modes from memory. For each candidate inter prediction mode, the motion estimation block may perform a motion estimation search within a range of pixels (e.g., +/−3 pixel area) and/or sub-pixels (e.g., +/−0.5 pixel area) around its indicated reference sample in full resolution. Since downscaled image data should be similar to full resolution image data, low resolution inter prediction modes may provide an indication where closely matching reference samples are expected to be located. As such, the motion estimation block may utilize the low resolution inter prediction modes as candidates. In this manner, the low resolution motion estimation block may facilitate reducing amount of image data searched by the motion estimation block and, thus, searching duration, which may facilitate real-time or near real-time transmission and/or display of image data.

Additionally, when operating one or more image frames ahead of the main encoding pipeline, the low resolution motion estimation block may determine statistics used to improve operational efficiency of the main encoding pipeline. For example, the low resolution motion estimation block may determine luma histogram statistics that indicate number of pixels in downscaled image data at each luma value. Additionally or alternatively, the low resolution motion estimation block may determine a zero vector sum of absolute difference (SAD) statistics, which may indicate difference between a downscaled prediction unit and a downscaled reference sample indicated by a zero vector. In some embodiments, the statistics may be used to detect when a scene change is expected to occur.

As described above, inter prediction techniques are premised on successively displayed image frames being similar. Thus, effectiveness of inter prediction techniques across a scene change may be greatly reduced. As such, the main encoding pipeline may select a prediction mode from one or more candidate intra prediction modes and/or a skip mode. Thus, in some embodiments, the motion estimation block may be disabled, which may facilitate further reducing computational complexity, improving operational efficiency, and/or reducing power consumption of the main encoding pipeline and, thus, an electrical device in which it is implemented.

Figure 1:
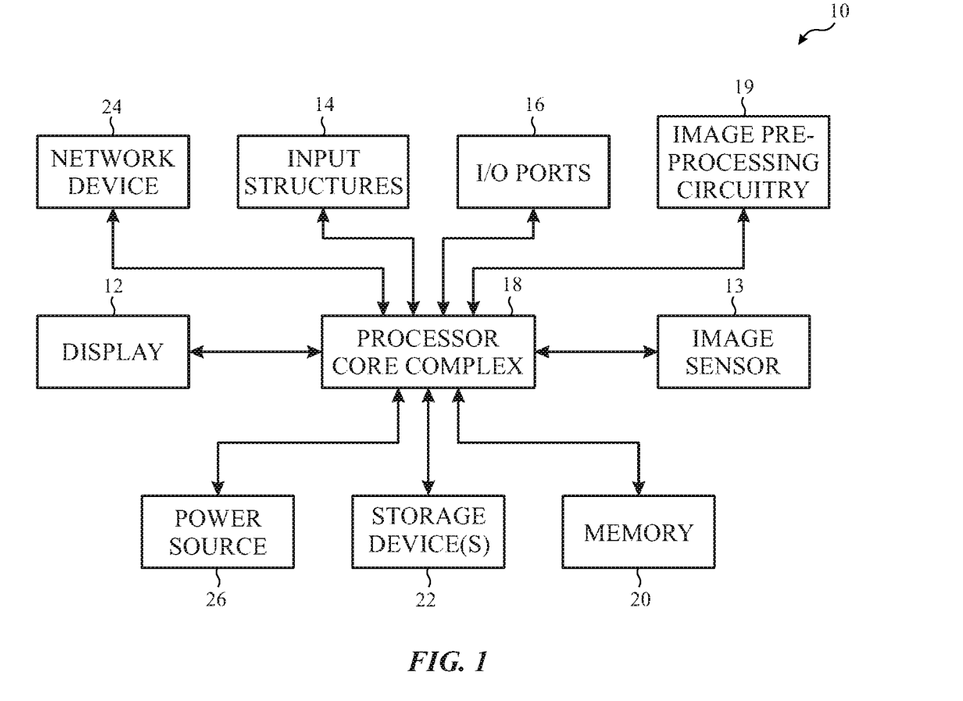
FIG. 1 is a block diagram of an electronic device, in accordance with an embodiment.

To help illustrate, an electronic device 10 (e.g., computing device) that may utilize an electronic display 12 to display image frames based on image data and/or an image sensor 13 to capture image data is described in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

The electronic device 10 includes the electronic display 12, an image sensor 13, one or more input structures 14 (e.g., input devices), one or more input/output (I/O) ports 16, a processor core complex 18 having one or more processor(s) or processor cores, image pre-processing circuitry 19, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor core complex 18 image pre-processing circuitry 19 may execute instructions stored in local memory 20 and/or the main memory storage device 22 to perform certain image processing operations. For example, the processor core complex 18 may encode image data captured by the image sensor 13 and/or decode image data for display on the electronic display 12. And, as discussed in greater detail below, the image pre-processing circuitry 19 may scale source image data (e.g., image data captured by the image sensor 13) to generate scaled image data that may be used to perform encoding operations. As such, the processor core complex 18 and image pre-processing circuitry 19 may include one or more general purpose microprocessors, one or more application specific processors (ASICs), one or more field programmable logic arrays (FPGAs), or any combination thereof. Additionally, in some embodiments, the image pre-processing circuitry 19 may be included in the processor core complex 18.

The local memory 20 and/or the main memory storage device 22 may be tangible, non-transitory, computer-readable mediums that store instructions executable by and data to be processed by the processor core complex 18 and the image pre-processing circuitry 19. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Using the network interface 24, the electronic device 10 may communicatively couple to a network and/or other computing devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

The processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output encoded image data to the portable storage device and/or receive encoded image data from the portable storage device.

The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the electronic device 10. The input structures 14 may include buttons, keyboards, mice, trackpads, and/or the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may present visual representations of information by display images (e.g., image frames), such as a graphical user interface (GUI) of an operating system, an application interface, a still image, or video content. As described above, the electronic display 12 may display an image based on corresponding image data. In some embodiments, the image data may be received from other electronic devices 10, for example, via the network interface 24 and/or the I/O ports 16. Additionally or alternatively, the image data may be generated by electronic device 10 using the image sensor 13. In some embodiments, image sensor 13 may digitally capture visual representations of proximate physical features as image data.

As described above, the image data may be encoded (e.g., compressed), for example, by the electronic device 10 that generated the image data, to reduce number of memory addresses used to store and/or bandwidth used to transmit the image data. Once generated or received, the encoded image data may be stored in local memory 20. Accordingly, to an display image corresponding with encoded image data, the processor core complex 18 or other image data processing circuitry may retrieve encoded image data from local memory 20, decode the encoded image data, and instruct the electronic display 12 to display image frames based on the decoded image data.

The electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. The handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Figure 2:
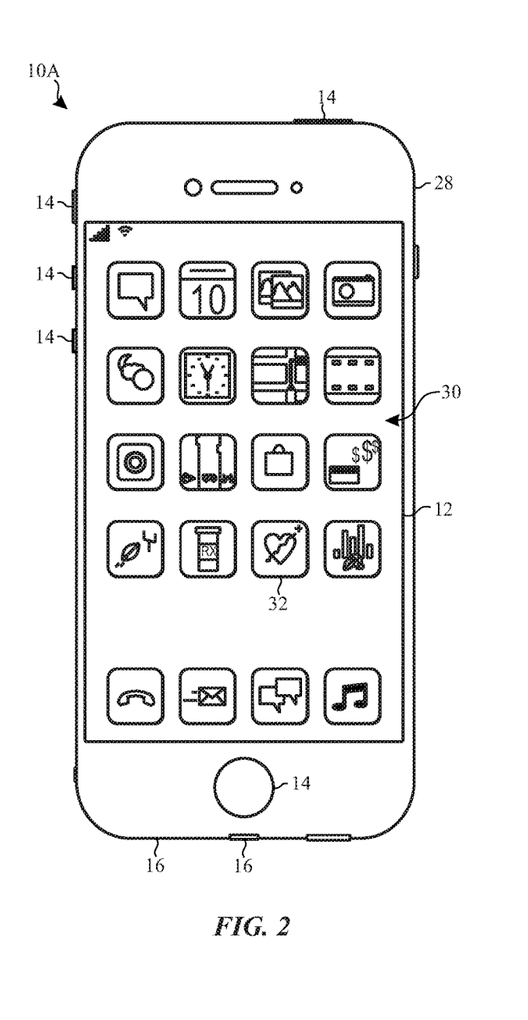
FIG. 2 is an example of the electronic device of FIG. 1, in accordance with an embodiment.

Input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
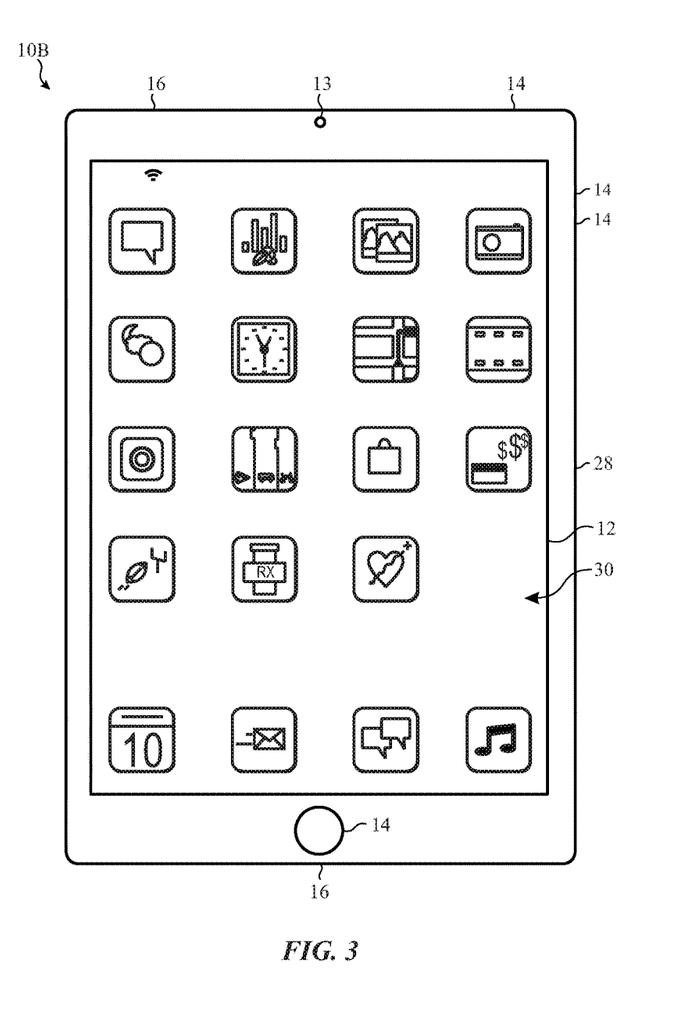
FIG. 3 is another example of the electronic device of FIG. 1, in accordance with an embodiment.
Figure 4:
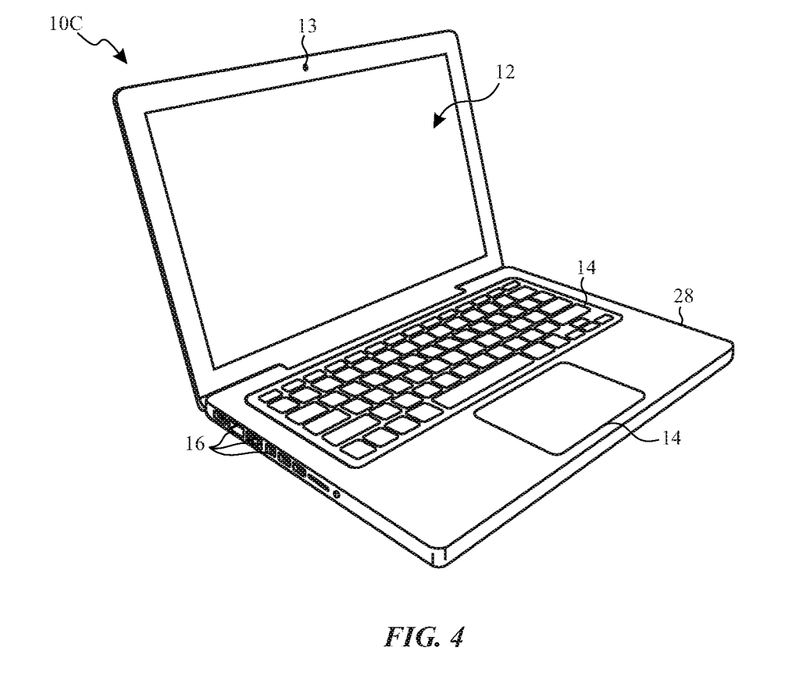
FIG. 4 is another example of the electronic device of FIG. 1, in accordance with an embodiment.
Figure 5:
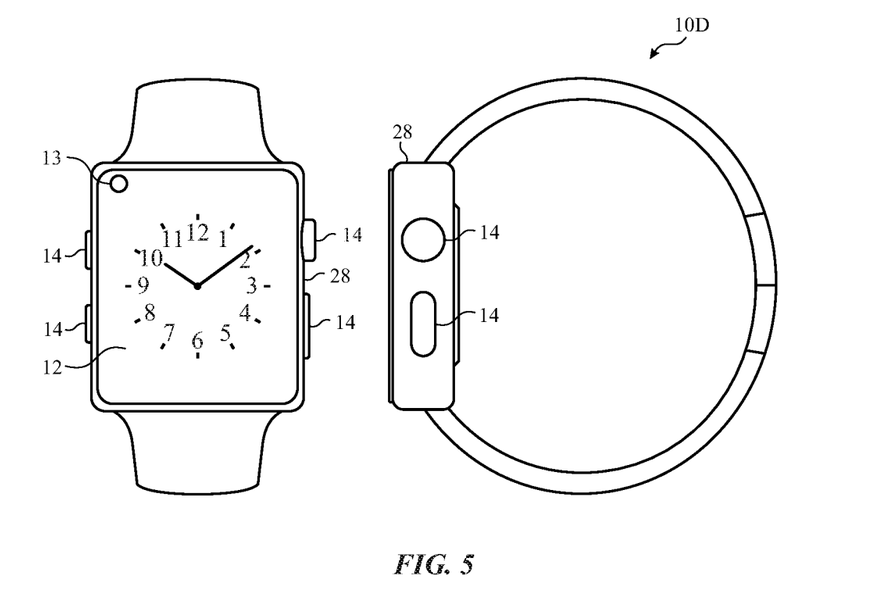
FIG. 5 is another example of the electronic device of FIG. 1, in accordance with an embodiment.

To further illustrate a suitable electronic device 10, a tablet device 10B is described in FIG. 3. For example, the tablet device 10B may be any iPad® model available from Apple Inc. Additionally, in other embodiments, the electronic device 10 may take the form of a computer 10C as described in FIG. 4. For example, the computer 10C may be any Macbook® or iMac® model available from Apple Inc. Furthermore, in other embodiments, the electronic device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of a corresponding image based on the image data may be limited to enable real-time or near real-time display and/or transmission. For example, image data captured by the image sensor 13 may be displayed on the electronic display 12 with minimal delay to enable a user to determine physical features proximate the image sensor 13 in real-time or near real-time. Additionally, image data generated by the electronic device 10 (e.g., by the image sensor 13) may be transmitted (e.g., broadcast) to one or more other electronic devices 10 to enable a real-time or near real-time streaming. To enable real-time or near real-time transmission and/or display, duration available to encode image data may be limited—particularly as the resolution of images and/or refresh rates of electronic displays 12 increase.

Figure 6:
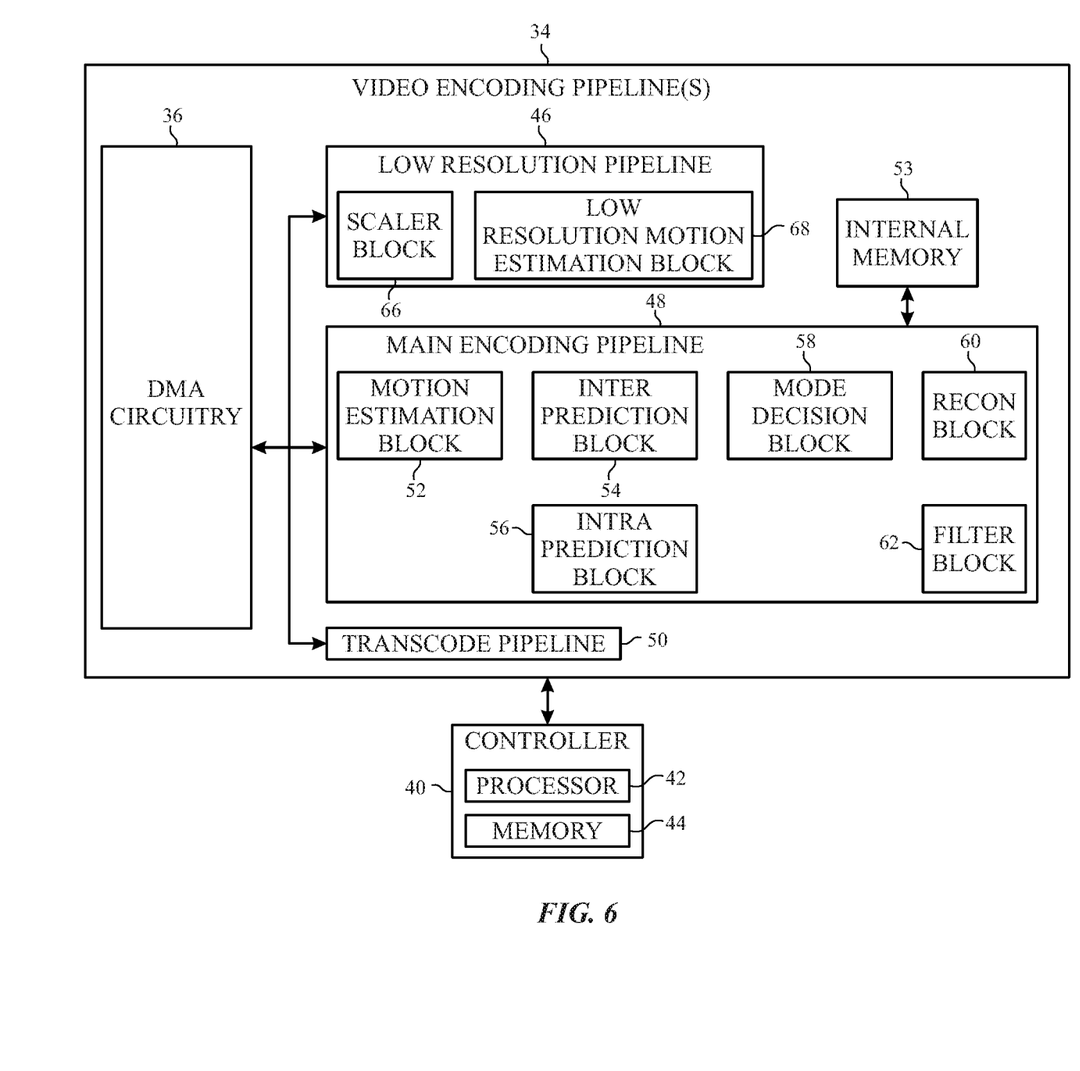
FIG. 6 is block diagram of a portion of the electronic device of FIG. 1 including a video encoding system, in accordance with an embodiment.

An example of a portion of an electronic device 10, which includes a video encoding system 34, is shown in FIG. 6. The video encoding system 34 may be implemented via circuitry, for example, packaged as a system-on-chip (SoC). Additionally or alternatively, the video encoding system 34 may be included in the processor core complex 18, a timing controller (TCON) in the electronic display 12, one or more other processing units, other processing circuitry, or any combination thereof.

The video encoding system 34 may be communicatively coupled to a controller 40. The controller 40 may generally control operation of the video encoding system 34. Although depicted as a single controller 40, in other embodiments, one or more separate controllers 40 may be used to control operation of the video encoding system 34. Additionally, in some embodiments, the controller 40 may be implemented in the video encoding system 34, for example, as a dedicated video encoding controller.

The controller 40 may include a controller processor 42 and controller memory 44. In some embodiments, the controller processor 42 may execute instructions and/or process data stored in the controller memory 44 to control operation of the video encoding system 34. In other embodiments, the controller processor 42 may be hardwired with instructions that control operation of the video encoding system 34. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display).

The video encoding system 34 includes DMA circuitry 36. In some embodiments, the DMA circuitry 36 may communicatively couple the video encoding system 34 to an image source, such as external memory that stores source image data, for example, generated by the image sensor 13 or received via the network interface 24 or the I/O ports 16.

To facilitate generating encoded image data, the video encoding system 34 may include multiple parallel pipelines. For example, in the depicted embodiment, the video encoding system 34 includes a low resolution pipeline 46, a main encoding pipeline 48, and a transcode pipeline 50. The main encoding pipeline 48 may encode source image data using prediction techniques (e.g., inter prediction techniques or intra prediction techniques), and the transcode pipeline 50 may subsequently entropy encode syntax elements that indicate encoding parameters (e.g., quantization coefficient, inter prediction mode, and/or intra prediction mode) used to prediction encode the image data.

To facilitate prediction encoding source image data, the main encoding pipeline 48 may perform various functions. To simplify discussion, the functions are divided between various blocks (e.g., circuitry or modules) in the main encoding pipeline 48. In the depicted embodiment, the main encoding pipeline 48 includes a motion estimation block 52, an inter prediction block 54, an intra prediction block 56, a mode decision block 58, a reconstruction block 60, and a filter block 64.

The motion estimation block 52 is communicatively coupled to the DMA circuitry 36. In this manner, the motion estimation block 52 may receive source image data via the DMA circuitry 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit.

A luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter (e.g., half resolution in the horizontal direction and half resolution in the vertical direction) the resolution of the coding unit when a 4:2:0 sampling format is used.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of the prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter prediction modes that can be used to encode a prediction unit. An inter prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter prediction mode, the motion estimation block 52 may search reconstructed luma image data, which may be previously generated by the reconstruction block 60 and stored in internal memory 53 (e.g., reference memory) of the video encoding system 34. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample. The values of the horizontal and vertical offsets may also be referred to as x-components and y-components, respectively.

In this manner, the motion estimation block 52 may determine candidate inter prediction modes (e.g., reference index and motion vector) for one or more prediction units in the coding unit. The motion estimation block 52 may then input candidate inter prediction modes to the inter prediction block 54. Based at least in part on the candidate inter prediction modes, the inter prediction block 54 may determine luma prediction samples (e.g., predictions of a prediction unit).

The inter prediction block 54 may determine a luma prediction sample by applying motion compensation to a reference sample indicated by a candidate inter prediction mode. For example, the inter prediction block 54 may apply motion compensation by determining luma of the reference sample at fractional (e.g., quarter or half) pixel positions. The inter prediction block 54 may then input the luma prediction sample and corresponding candidate inter prediction mode to the mode decision block 58 for consideration. In some embodiments, the inter prediction block 54 may sort the candidate inter prediction modes based on associated mode cost and input only a specific number to the mode decision block 58.

The mode decision block 58 may also consider one or more candidate intra predictions modes and corresponding luma prediction samples output by the intra prediction block 56. The main encoding pipeline 48 may be capable of implementing multiple (e.g., 13, 17, 25, 29, 35, 38, or 43) different intra prediction modes to generate luma prediction samples based on adjacent pixel image data. Thus, in some embodiments, the intra prediction block 56 may determine a candidate intra prediction mode and corresponding luma prediction sample for a prediction unit based at least in part on luma of reconstructed image data for adjacent (e.g., top, top right, left, or bottom left) pixels, which may be generated by the reconstruction block 60.

For example, utilizing a vertical prediction mode, the intra prediction block 56 may set each column of a luma prediction sample equal to reconstructed luma of a pixel directly above the column. Additionally, utilizing a DC prediction mode, the intra prediction block 56 may set a luma prediction sample equal to an average of reconstructed luma of pixels adjacent the prediction sample. The intra prediction block 56 may then input candidate intra prediction modes and corresponding luma prediction samples to the mode decision block 58 for consideration. In some embodiments, the intra prediction block 56 may sort the candidate intra prediction modes based on associated mode cost and input only a specific number to the mode decision block 58.

The mode decision block 58 may determine encoding parameters to be used to encode the source image data (e.g., a coding unit). In some embodiments, the encoding parameters for a coding unit may include prediction technique (e.g., intra prediction techniques or inter prediction techniques) for the coding unit, number of prediction units in the coding unit, size of the prediction units, prediction mode (e.g., intra prediction modes or inter prediction modes) for each of the prediction units, number of transform units in the coding unit, size of the transform units, whether to split the coding unit into smaller coding units, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra prediction techniques.

On the other hand, in a P-frame or B-frame, source image data may be encoded by referencing image data used to display the same image frame and/or a different image frames. More specifically, in a P-frame, source image data may be encoding by referencing image data associated with a previously coded or transmitted image frame. Additionally, in a B-frame, source image data may be encoded by referencing image data used to code two previous image frames. More specifically, with a B-frame, a prediction sample may be generated based on prediction samples from two previously coded frames; the two frames may be different from one another or the same as one another. Accordingly, when the image frame is a P-frame or a B-frame, the mode decision block 58 may determine that each coding unit in the image frame may be prediction encoded using either intra techniques or inter techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe the number, size, location, and prediction mode of luma prediction blocks in a coding unit. Thus, the mode decision block 58 may determine a candidate inter prediction mode configuration using one or more of the candidate inter prediction modes received from the inter prediction block 54. Additionally, the mode decision block 58 may determine a candidate intra prediction mode configuration using one or more of the candidate intra prediction modes received from the intra prediction block 56.

Since a coding unit may utilize the same prediction technique, the mode decision block 58 may determine prediction technique for the coding unit by comparing rate-distortion metrics (e.g., costs) associated with the candidate prediction mode configurations and/or a skip mode. In some embodiments, the rate-distortion metric may be determined by summing a first product obtained by multiplying an estimated rate that indicates number of bits expected to be used to indicate encoding parameters and a first weighting factor for the estimated rate and a second product obtained by multiplying a distortion metric (e.g., sum of squared difference) resulting from the encoding parameters and a second weighting factor for the distortion metric. The first weighting factor may be a Lagrangian multiplier, and the first weighting factor may depend on a quantization parameter associated with image data being processed.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the reconstruction block 60. Additionally or alternatively, the distortion metric may be a sum of absolute transformed difference (SATD) between the luma coding block and reconstructed luma image data received from the reconstruction block 60.

In some embodiments, prediction residuals (e.g., differences between source image data and prediction sample) resulting in a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra prediction mode configuration may include expected number of bits used to indicate intra prediction technique (e.g., coding unit overhead), expected number of bits used to indicate intra prediction mode, expected number of bits used to indicate a prediction residual (e.g., source image data—prediction sample), and expected number of bits used to indicate a transform unit split. On the other hand, the estimated rate for an inter prediction mode configuration may include expected number of bits used to indicate inter prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

In embodiments where the rate-distortion metric of equation (1) is used, the mode decision block 58 may select a prediction mode configuration or skip mode with the lowest associated rate-distortion metric for a coding unit. In this manner, the mode decision block 58 may determine encoding parameters for a coding unit, which may include prediction technique (e.g., intra prediction techniques or inter prediction techniques) for the coding unit, number of prediction units in the coding unit, size of the prediction units, prediction mode (e.g., intra prediction modes or inter prediction modes) for each of the prediction unit, number of transform units in the coding block, size of the transform units, whether to split the coding unit into smaller coding units, or any combination thereof.

To facilitate improving perceived image quality resulting from decoded image data, the main encoding pipeline 48 may then mirror decoding of encoded image data. To facilitate, the mode decision block 58 may output the encoding parameters and/or luma prediction samples to the reconstruction block 60. Based on the encoding parameters and reconstructed image data associated with one or more adjacent blocks of image data, the reconstruction block 60 may reconstruct image data.

More specifically, the reconstruction block 60 may generate the luma component of reconstructed image data. In some embodiments, the reconstruction block 60 may generate reconstructed luma image data by subtracting the luma prediction sample from luma of the source image data to determine a luma prediction residual. The reconstruction block 60 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The reconstruction block 60 may then add the reconstructed luma prediction residual to the luma prediction sample to determine reconstructed luma image data. As described above, the reconstructed luma image data may then be fed back for use in other blocks in the main encoding pipeline 48, for example, via storage in internal memory 53 of the main encoding pipeline 48. Additionally, the reconstructed luma image data may be output to the filter block 62.

The reconstruction block 60 may also generate both chroma components of reconstructed image data. In some embodiments, chroma reconstruction may be dependent on sampling format. For example, when luma and chroma are sampled at the same resolution (e.g., 4:4:4 sampling format), the reconstruction block 60 may utilize the same encoding parameters as used to reconstruct luma image data. In such embodiments, for each chroma component, the reconstruction block 60 may generate a chroma prediction sample by applying the prediction mode configuration determined by the mode decision block 58 to adjacent pixel image data.

The reconstruction block 60 may then subtract the chroma prediction sample from chroma of the source image data to determine a chroma prediction residual. Additionally, the reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, which may be input to the filter block 64.

However, in other embodiments, chroma sampling resolution may vary from luma sampling resolution, for example when a 4:2:2 or 4:2:0 sampling format is used. In such embodiments, encoding parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decoded image data, the filter block 62 may filter the reconstructed image data (e.g., reconstructed chroma image data and/or reconstructed luma image data). In some embodiments, the filter block 62 may perform deblocking and/or sample adaptive offset (SAO) functions. For example, the filter block 62 may perform deblocking on the reconstructed image data to reduce perceivability of blocking artifacts that may be introduced. Additionally, the filter block 62 may perform a sample adaptive offset function by adding offsets to portions of the reconstructed image data.

To enable decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), encoding parameters used by the reconstruction block 60 (e.g., quantization coefficients), and encoding parameters used by the filter block 62. To facilitate communication, the encoding parameters may be expressed as syntax elements. For example, a first syntax element may indicate a prediction mode (e.g., inter prediction mode or intra prediction mode), a second syntax element may indicate a quantization coefficient, a third syntax element may indicate configuration of prediction units, and a fourth syntax element may indicate configuration of transform units.

The transcode pipeline 50 may then convert a bin stream, which is representative of syntax elements generated by the main encoding pipeline 48, to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

Additionally, the video encoding system 34 may be communicatively coupled to an output. In this manner, the video encoding system 34 may output encoded (e.g., compressed) image data to such an output, for example, for storage and/or transmission. Thus, in some embodiments, the local memory 20, the main memory storage device 22, the network interface 24, the I/O ports 16, the controller memory 44, or any combination thereof may serve as an output.

As described above, the duration provided for encoding image data may be limited, particularly to enable real-time or near real-time display and/or transmission. To improve operational efficiency (e.g., operating duration and/or power consumption) of the main encoding pipeline 48, the low resolution pipeline 46 may include a scaler block 66 and a low resolution motion estimation (ME) block 68. The scaler block 66 may receive image data and downscale the image data (e.g., a coding unit) to generate low-resolution image data. For example, the scaler block 66 may downscale a 32×32 coding unit to one-sixteenth resolution to generate an 8×8 downscaled coding unit. In other embodiments, such as embodiments in which pre-processing circuitry generates image data (e.g., low-resolution image data) from source image data, the low resolution pipeline may not include the scaler block 66, or the scaler block 66 may not be utilized to downscale image data.

The low resolution motion estimation block 68 may improve operational efficiency by initializing the motion estimation block 52 with candidate inter prediction modes, which may facilitate reducing searches performed by the motion estimation block 52. Additionally, the low resolution motion estimation block 68 may improve operational efficiency by generating global motion statistics that may be utilized by the motion estimation block 52 to determine a global motion vector.

Figure 7:
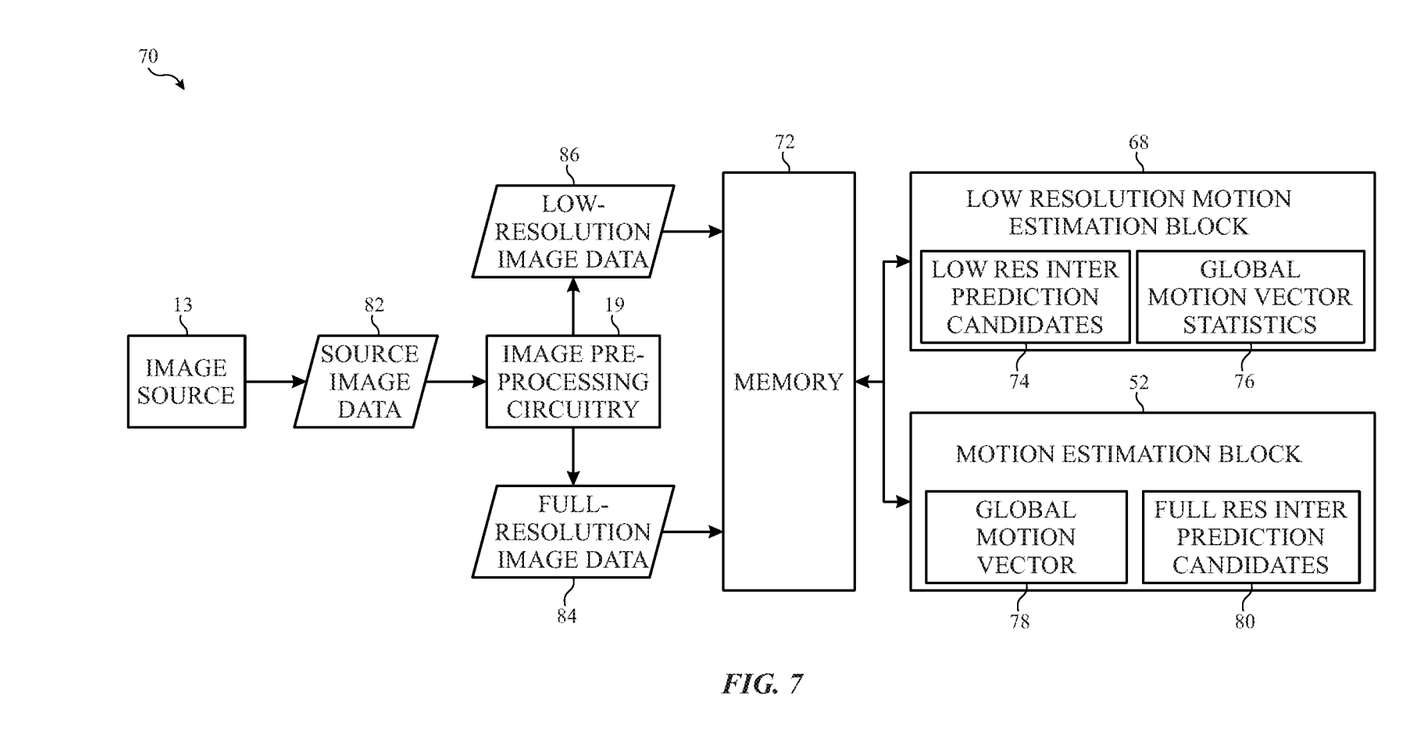
FIG. 7 is block diagram of a portion of the video encoding system of FIG. 6 including a low resolution motion estimation block and a motion estimation block along with the image source and image pre-processing circuitry of FIG. 1, in accordance with an embodiment.

To help illustrate, a portion 70 of the video encoding system 34, which includes the low resolution motion estimation block 68 and the motion estimation block 52 coupled to external memory 72, is shown in FIG. 7 along with the image source 13, and the image pre-processing circuitry 19, and various types of image data (e.g., source image data 82, full-resolution image data 84, and low-resolution image data 86). In some embodiments, the external memory 72 may be a tangible, non-transitory, computer-readable medium accessible by the video encoding system 34, for example, to store data and/or retrieve data, such as image data and/or statistics data. Accordingly, in some embodiments, the external memory 72 may be included in the controller memory 44, the local memory 20, or the main memory storage device 22. In other embodiments, the external memory 72 may be a separate storage component dedicated to the video encoding system 34. Furthermore, it should be noted that the image pre-processing circuitry 19 may be included in the video encoding system 34.

The external memory 72 is communicatively coupled to the low resolution motion estimation block 68 and the motion estimation block 52 of the main encoding pipeline 48. In some embodiments, the external memory 72 may provide direct memory access (DMA) that enables the low resolution motion estimation block 68 and the main encoding pipeline 48 to access the external memory 72 relative independently. Thus, in such embodiments, the low resolution motion estimation block 68 may process image frames in advance of the main encoding pipeline 48, which may enable the low resolution motion estimation block 68 to determine information (e.g., low resolution candidate inter prediction modes and/or motion vector statistics) useful for the main encoding pipeline 48, particularly the motion estimation block 52 and the mode decision block 58.

For example, the low resolution motion estimation block 68 may analyze low resolution image data to determine one or more low resolution inter prediction mode candidates 74, which may be analyzed as full resolution inter prediction mode candidates 80 by the motion estimation block 52. To facilitate improving operational efficiency, in some embodiments, the low resolution motion estimation block 68 may prune the low resolution inter prediction mode candidates 74 before they are evaluated by the motion estimation block 52, for example, to consolidate low resolution inter prediction mode candidates 74 that indicate similar motion vectors.

Additionally or alternatively, the low resolution motion estimation block 68 may determine global motion vector statistics 76 based at least in part on the low resolution inter prediction mode candidates 74. In some embodiments, the global motion vector statistics 76 determined by the low resolution motion estimation block 68 may facilitate image stabilization. Additionally, in some embodiments, the low resolution motion estimation block 68 may determine similar portions of successively displayed images to determine trends in motion, for example, as a global motion vector. Based on the motion trends, successively displayed image frames may be stabilized. In this manner, the low resolution motion estimation block 68 may determine the global motion vector statistics 76 that are useful for improving operational efficiency of the main encoding pipeline 48 and, thus, may facilitate real-time or near real-time transmission and/or display of image data.

Furthermore, the low resolution inter prediction mode candidates 74 and global motion vector statistics 76 may be utilized by the motion estimation block 52 of the main encoding system 34 to determine a global motion vector 78 and full resolution inter prediction mode candidates 80. In some embodiments, the global motion vector 78 may be indicative of motion trends across multiple image and, thus, may be used by the motion estimation block 52 to improve the evaluated full resolution inter prediction mode candidates 80, for example, by offsetting a full resolution inter prediction mode candidate 80 to compensate for the motion trend.

Returning briefly to FIG. 6, the inter prediction block 54 may determine luma prediction samples by applying each of the full resolution inter prediction mode candidates 80. Additionally, as described above, the mode decision block 58 may consider one or more candidate intra predictions modes and corresponding luma prediction samples to determine a candidate intra prediction mode and corresponding luma prediction sample for a prediction unit, which the reconstruction block 60 may use to generate reconstructed image data.

Continuing with the discussion of FIG. 7, to help describe an example of how image data may be encoded, the low resolution motion estimation block 68 and the motion estimation block 52, may perform several operations such as determining candidate low resolution inter prediction modes (e.g., via the low resolution motion estimation block 68), determining global motion vector statistics 76 based on the candidate low resolution inter prediction modes (e.g., via the low resolution motion estimation block 68), determining the global motion vector 78 (e.g., via the motion estimation block 52 based on the global motion vector statistics 76), and determining an inter prediction mode based on the global motion vector and the candidate low resolution inter prediction modes 80 (e.g., via the motion estimation block 52). Such operations 90 may be implemented at least in part based on circuit connections formed (e.g., programmed) in the video encoding system 34. Additionally or alternatively, these operations may be implemented at least in part by executing instructions stored in a tangible non-transitory computer-readable medium, such as the controller memory 44, using processing circuitry, such as the controller processor 42. Some image data encoding techniques are described in more detail in U.S. patent application Ser. No. 16/032,925, entitled "Global Motion Vector Video Encoding Systems and Methods," which is hereby incorporated by reference in its entirety for all purposes.

Generally, the operations mentioned above could be performed utilized image data generated from the source image data 82. For instance, as mentioned above, the low resolution motion estimate block 68 may generate downscaled image data from the source image data 82. However, for certain types of source image data 82 (e.g., relatively higher resolution source image data), utilizing the low resolution motion estimation block 68 to scale source image data 82 may be burdensome (e.g., utilize high amounts of power and/or processing resources) and utilize relatively large amounts of the memory 72. To enable more of the resources of the low resolution motion estimation block 68 to be utilized for encoding techniques (e.g., determining low resolution inter prediction candidates 74 and global motion vector statistics 76) and to reduce the amount of bandwidth of the memory 72 being utilized, the image pre-processing circuitry 19 may be utilized to generate image data (e.g., full-resolution image data 84 and low-resolution image data 86) from the source image data 82 that can be stored in the memory 72 and utilized by the low resolution motion estimation block 68 and the motion estimation block 52. By doing so, the video encoding system 34 may be able to encode image data more quickly and efficiently.

Figure 8:
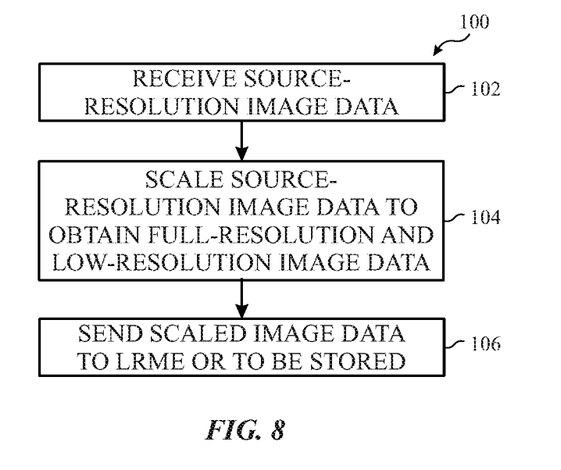
FIG. 8 is a flow diagram of a process for processing source image data using the image pre-processing circuitry of FIG. 1, in accordance with an embodiment.

Bearing this in mind, FIG. 8 is a flow diagram of a process 100 for processing source image data. The process 100 may be implemented at least in part by executing instructions stored in a tangible non-transitory computer-readable medium, such as the memory 20 or storage devices 22, using processing circuitry, such as the image pre-processing circuitry 19. In general, the process 100 includes receiving source-resolution image data (process block 102), scaling the source-resolution image data to obtain full-resolution image data and low-resolution image data (process block 104), and sending the scaled image data to the low resolution motion estimation block 68 or to be stored in memory (process block 106).

At process block 102, the image pre-processing circuitry 19 receives source-resolution image data such as the source image data 82. The source image data 82 may be generated by the image source 13 or may be image data that is received by the electronic device 10. The source image data 82 may have a resolution that is higher than the resolution that image data will be displayed at on the display 12. For example, while the display 12 may be utilized to present image data at a 4K UHD (ultra high-definition) resolution (e.g., 3840×2160 pixels), the source image data 82 may be a higher resolution (e.g., include data for 4224×2376 pixels), and the full-resolution image data 84 that is generated as discussed below may have the resolution at which image content will be presented on the display 12. It should be noted that the presently discussed techniques may be implemented for other resolutions including resolutions that are higher than 4K UHD (e.g., 8K UHD (7680×4320 pixels), 16K (e.g., 15360×8640 pixels)) or lower than 4K UHD (e.g., Full HD (e.g., 1920×1080 pixels), HD (e.g., 1280×720 pixels)). Furthermore, in some embodiments, the source image data 82 may have a lower resolution than image content that will be displayed via the display 12. As discussed below, such source image data 82 may be enhanced (e.g., upscaled). Additionally, in some embodiments, the source image data may have the same resolution as the image content that will be displayed on the display 12.

At process block 104, the image pre-processing circuitry 19 generates full-resolution image data 84 and low-resolution image data 86 from the source-resolution image data (e.g., the source image data 82). The full-resolution image data 84 is generally image data that will be displayed on the display 12. In other words, the full-resolution image data 84 has a resolution equal to that of the resolution at which the display 12 displays content. As noted above, the full-resolution image data 84 may have a lower resolution or higher resolution than the source image data 82. For instance, to continue the example above, the source image data 82 may be 4224×2376 pixels. The image pre-processing circuitry 19 may generate 4K UHD resolution (e.g., 3840×2160 pixels) full-resolution image data 84 from the source image data. In other embodiments, the full-resolution image data 84 may be generated by upscaling the source image data 82 (e.g., in cases in which the source image data 82 has a lower resolution than image content to be displayed via the display 12). Furthermore, in some embodiments, the full-resolution image data 84 may be the same resolution as the source image data 82.

The image pre-processing circuitry 19 may also generate the low-resolution image data 86, which is generally image data having a lower resolution than the full-resolution image data 84 (and source image data 82) that the low resolution motion estimation block 68 may utilize when performing encoding techniques. In one embodiment, the low-resolution image data 86 may have a resolution that is one-sixteenth of the full-resolution image data 84. For instance, to continue with the example in which the full-resolution image data 84 is 4K UHD (e.g., 3840×2160 pixels), the low-resolution image data may be image data for 960×540 pixels. Additionally, it should be noted that the low-resolution image data may be generated by downscaling the full-resolution image data 84. Furthermore, while the low-resolution image data 86 is described above as having a resolution that is one sixteenth of the resolution of the full-resolution image data 84, in other embodiments, the resolution of the low-resolution image data 86 may be different (e.g., one fourth, one eighth, one thirty-second).

At process block 106, the image pre-processing circuitry 19 may send scaled image data to the low resolution motion estimation block 68 and/or to be stored in memory. More specifically, the image pre-processing circuitry 19 may send the low-resolution image data 86 to the low resolution motion estimation block 68, send the low-resolution image data 86 to be stored in memory (e.g., memory 72), send the full-resolution image data 84 to be stored (e.g., in the memory 72), or a combination thereof. For example, the image pre-processing circuitry 19 may send both the low-resolution image data 86 and the full-resolution image data 84 to be stored in the memory 72, and the low-resolution image data 86 and the full-resolution image data 84 may respectively be accessed by the low resolution motion estimation block 68 and motion estimation block 52 at a subsequent time. Thus, because the low-resolution image data 86 uses less memory than the full-resolution image data 84, when the low resolution motion estimation block 68 reads image data (e.g., the low-resolution image data 86), the amount of memory bandwidth is reduced compared to if the full-resolution image data 84 were read instead. Accordingly, by generating and storing the full-resolution image data 84 and the low-resolution image data 86 and utilizing the low-resolution image data 86 when performing low resolution motion estimation techniques, the amount of memory bandwidth (e.g., of the memory 72) utilized by the electronic device 10 may be reduced.

Figure 9:
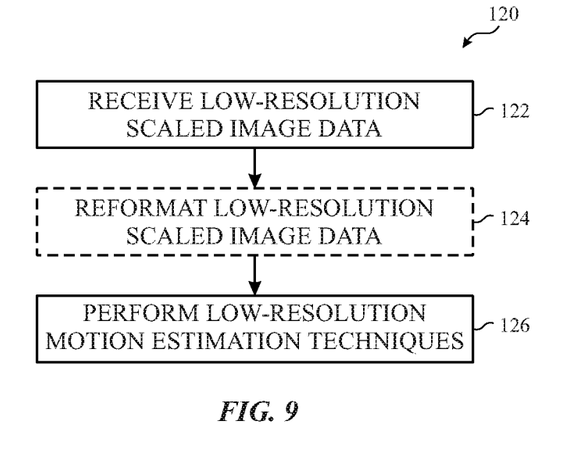
FIG. 9 is a flow diagram of a process for utilizing the low-resolution image data to perform encoding techniques, in accordance with an embodiment.

Keeping the discussion of FIG. 7 and FIG. 8 in mind, FIG. 9 is a flow diagram of a process 120 for utilizing the low-resolution image data 86 to perform encoding techniques. The process 120 may be implemented at least in part by executing instructions stored in a tangible non-transitory computer-readable medium, such as the controller memory 44, memory 20, or storage devices 22, using processing circuitry, such as the controller processor 42. The process 120 may include receiving low-resolution scaled image data (process block 122), reformatting the low-resolution scaled image data (process block 124), and performing low-resolution motion estimation techniques (process block 126).

At process block 122, the low resolution motion estimation block may receive the low-resolution image data 86. For example, the controller 40 may instruct the low resolution motion estimation block 68 to request the low-resolution image data 86 from the memory 72, the low resolution motion estimation block 68 may receive the low-resolution image data 86 in response to such a request.

At process block 124, the low resolution motion estimation block 68 may reformat the low-resolution image data 86. For example, the low resolution motion estimation block 68 may further scale the low-resolution image data 86 (e.g., to increase or decrease a resolution of the low-resolution image data 86). In some embodiments, the low resolution motion estimation block 68 may not reformat the low-resolution image data. In other embodiments, reformatting the low-resolution image data may include generating prediction units using the low-resolution image data.

At process block 126, the low resolution motion estimation block 68 may perform low-resolution motion estimation techniques using the low-resolution image data (e.g., as received from the memory 72 or reformatted by the low resolution motion estimation block 68). For example, the low resolution motion estimation block 68 may determine the low resolution inter prediction candidates 74 and global motion vector statistics utilizing the low-resolution image data 86.

Utilizing the low resolution inter prediction candidates 74 and global motion vector statistics generated utilizing the low-resolution image data 86, the motion estimation block 52 may encode the full-resolution image data 84 utilizing techniques discussed above. Accordingly, image data may be encoded by utilizing already-downscaled image data.

Accordingly, the technical effects of the present disclosure include improving operational efficiency of a video encoding system used to encode (e.g., compress) source image data. In some embodiments, the video encoding system may utilize previously-scaled image data generated from source image data when encoding image data. In this manner, the low resolution pipeline may determine information, such as low resolution inter prediction modes and/or statistics, which may be used in the main encoding pipeline to improve operational efficiency, without first downscaling image data. By being able to read low-resolution image data (e.g., in comparison to reading full-resolution image data and generating low-resolution image data), low resolution motion estimation techniques may be performed utilized less memory bandwidth. Accordingly, the efficiency of the video encoding system may be enhanced.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A video encoding system comprising:
   image processing circuitry configured to:
   receive source image data; and
   derive full-resolution image data and low-resolution image data from the source image data;
   memory configured to store the low-resolution image data;
   a low resolution pipeline separate from the image processing circuitry and the memory, wherein the low resolution pipeline is configured to receive the low-resolution image data from the memory without further downscaling and, after receiving the low-resolution image data from the memory, determine one or more low resolution inter prediction modes based on the low-resolution image data; and
   a main pipeline separate from the image processing circuitry and configured to encode the full-resolution image data based on the one or more low resolution inter prediction modes.

2. The video encoding system of claim 1, wherein:
   the memory is configured to store the full-resolution image data; and the main pipeline is configured to encode the full-resolution image data after receiving the full-resolution image data from the memory.

3. The video encoding system of claim 1, wherein the image processing circuitry is configured to derive the full-resolution image data and the low-resolution image data by downscaling the source image data.

4. The video encoding system of claim 1, wherein the image processing circuitry is configured to derive the full-resolution image data by upscaling the source image data.

5. The video encoding system of claim 1, wherein the full-resolution image data comprises one or more frames of image data having 4K resolution or higher.

6. The video encoding system of claim 1, wherein:
the source image data comprises data for a first number of pixels;
the full-resolution image data comprises data for a second number of pixels;
the low-resolution image data comprises data for a third number of pixels; and
a sum of the second number of pixels and the third number of pixels is less than the first number of pixels.

7. The video encoding system of claim 1, wherein the low-resolution image data comprises a first resolution that is one sixteenth of a second resolution of the full-resolution image data.

8. The video encoding system of claim 1, wherein the video encoding system is included within a portable phone, a media player, a personal data organizer, a handheld game platform, a tablet device, a computer, or any combination thereof.

9. The video encoding system of claim 1, wherein:
the memory is configured to store the full-resolution image data; and
the main pipeline is configured to encode the full-resolution image data after receiving the full-resolution image data from the memory.

10. A method, comprising:
receiving, via image processing circuitry, source image data having a first resolution;
deriving, via the image processing circuitry, full-resolution image data having a second resolution and low-resolution image data having a third resolution from the source image data;
storing the full-resolution image data and the low-resolution image data in memory;
retrieving, via a low resolution motion estimation block of an encoding system that is separate from the image processing circuitry and the memory, the low-resolution image data from the memory without performing additional downscaling; and
after retrieving the low-resolution image data from the memory, encoding, via the encoding system, the full-resolution image data based on one or more determinations made utilizing the low-resolution image data.

11. The method of claim 10, wherein the second resolution is lower than the first resolution.

12. The method of claim 11, wherein the third resolution is lower than the second resolution.

13. The method of claim 10, comprising making, via the low resolution motion estimation block, the one or more determinations by determining one or more lower resolution inter prediction modes based on the low-resolution image data.

14. The method of claim 10, wherein receiving the source image data comprises receiving the source image data from an image sensor communicatively coupled to the image processing circuitry.

15. The method of claim 10, wherein deriving the full-resolution image data and the low-resolution image data comprises downscaling the source image data.

16. An electronic device, comprising:
image processing circuitry configured to:
receive source image data; and
derive full-resolution image data and low-resolution image data from the source image data;
memory communicatively coupled to the image processing circuitry and configured to store the low-resolution image data and the full-resolution image data;
a low resolution pipeline separate from the image processing circuitry and the memory, wherein the low resolution pipeline is configured to receive the low-resolution image data from the memory without performing additional downscaling on the low-resolution image data and, after receiving the low-resolution image data from the memory determine one or more low resolution inter prediction modes based on the low-resolution image data; and
a main pipeline separate from the image processing circuitry and the memory, wherein the main pipeline is configured to receive the full-resolution image data from the memory and encode the full-resolution image data received from the memory based on the one or more low resolution inter prediction modes.

17. The electronic device of claim 16, comprising an image sensor configured to generate the source image data.

18. The electronic device of claim 17, wherein the image sensor comprises a camera.

19. The electronic device of claim 16, wherein the image processing circuitry is configured to derive the low-resolution image data from the full-resolution image data.

20. The electronic device of claim 16, wherein the electronic device comprises a portable phone, a media player, a personal data organizer, a handheld game platform, a tablet device, a computer, or any combination thereof.

* * * * *